United States Patent
Isaac et al.

(10) Patent No.: US 8,141,805 B1
(45) Date of Patent: Mar. 27, 2012

(54) SYSTEM FOR DETERMINING COUNTER KNIFE BANK INSERTION POSITION

(75) Inventors: Nathan E. Isaac, Lancaster, PA (US);
Jason M. Benes, Mount Joy, PA (US);
Edmund N. Holt, II, Denver, PA (US);
Brent E. Smith, Lititz, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/875,433

(22) Filed: Sep. 3, 2010

(51) Int. Cl.
*B02C 25/00* (2006.01)
(52) U.S. Cl. .......... 241/242; 241/37; 241/287
(58) Field of Classification Search .......... 56/10.2 R, 56/10.2 G; 241/30, 37, 242, 243, 287
See application file for complete search history.

(56) References Cited

U.S. PATENT DOCUMENTS

| | | | |
|---|---|---|---|
| 5,802,825 A | 9/1998 | Chow et al. | |
| 6,255,812 B1 | 7/2001 | Voigt et al. | |
| 6,370,851 B1 | 4/2002 | Uros et al. | |
| 6,546,705 B2 | 4/2003 | Scarlett et al. | |
| 6,769,239 B1 | 8/2004 | Webb | |
| 7,021,207 B2 | 4/2006 | Dubois | |
| 7,404,284 B2 | 7/2008 | Viaud et al. | |
| 7,553,225 B2 | 6/2009 | Benes | |
| 7,648,413 B2 | 1/2010 | Duquesne et al. | |
| 7,677,965 B2 | 3/2010 | Farley et al. | |
| 2010/0048269 A1 | 2/2010 | Ricketts et al. | |

*Primary Examiner* — Mark Rosenbaum
(74) *Attorney, Agent, or Firm* — Michael G. Harms

(57) ABSTRACT

A chopper assembly for a combine includes a rotary chopper element, a chopper grate assembly spaced from the rotary chopper element to form a passageway for crop residue and a knife bank adjustably connected to the chopper grate assembly. The knife bank is movable between a first position where the knife bank is fully inserted into the passageway and a second position where the knife bank is full retracted from the passageway. An actuating mechanism is used to move the knife bank between the first position and the second position. A position sensor is used to measure the position of the actuating mechanism and determine the position of the knife bank relative to the passageway.

18 Claims, 16 Drawing Sheets

SYSTEM FOR DETERMINING COUNTER KNIFE BANK INSERTION POSITION

BACKGROUND

The present application relates generally to a chopper assembly for a combine. The present application relates more specifically to a system to determine the position of a counter knife bank in a chopper assembly.

Harvesting equipment, such as agricultural combines, can use integral chopper assemblies or systems to transport material away from the threshing system and to also treat the material, e.g., by further cutting the material, as it is being transported away from the threshing system. A rotary chopper element or portion of the integral chopper system can be operated at or near 3000 revolutions per minute (RPM) to transport the material from the threshing system to a spreading system. When operated at 3000 RPM, the material is transported with the shortest mean length of cut to permit modern minimum tillage applications. In a less common embodiment, the integral chopper system can be operated at a speed of about 800 RPM to more gently transport the material from the threshing system to a spreading system and with considerably less chopping activity. When operated at 800 RPM, the material can be transported to the spreading system with the longest length and least amount of damage.

Integral chopper systems can have a residue chopper assembly that has a rotary chopper component or element disposed laterally within a housing extending generally horizontally across the flow path of the crop residue through the housing, as well as a counter knife assembly extending generally parallel to and spaced from the rotary chopper element. The counter knife assembly has included a chopper grate assembly spaced below and extending generally parallel to the rotary chopper element and a knife mounting assembly positioned generally beneath the chopper grate assembly.

Often, the counter knife assembly can have an adjustment mechanism that is operable to vary the spacing between a grate portion of the chopper grate assembly and the knife mounting assembly, as well as the degree of projection of the blade elements of the knife mounting assembly through the slots of the grate portion. The adjustment mechanism can be operated to move the knife mounting assembly between a fully engaged or inserted position with the blade elements of the knife mounting assembly extending through the slots towards the rotary chopper element and a fully retracted position in which the blade elements are fully withdrawn or retracted from the slots. In addition, the adjustment mechanism can move the blade elements to various positions between a fully engaged position and a fully retracted position.

When the knife mounting assembly is in an engaged position, either fully or partially, the crop residue can be chopped into smaller pieces by the cooperative actions of the knife blades or elements of the knife mounting assembly and the knife blades or paddles on the rotating rotary chopper element as the crop residue is moved and propelled rearward. The knife mounting assembly is usually positioned into an engaged position, either fully or partially, when the rotary chopper element is operated at or near 3000 RPM and is usually positioned in a fully retracted position when the rotary chopper element is operated at 800 RPM to avoid excessive power requirements for the combine. In addition, different types of crop material may have different desired chopping requirements. Thus, it would be desirable to know the position of the knife mounting assembly to avoid excessive power requirements when operating the chopper system at lower speeds, e.g., 800 RPM, and to confirm that the crop material is being cut as desired.

One example of a system for determining the position of the knife mounting assembly is disclosed in U.S. Pat. No. 7,648,413. As described in the patent, a sensor is placed in association with the knife blades of the knife mounting assembly to provide a signal representative of the position of the knives. Since the sensor is positioned in direct association with the knives, the sensor requires precise calibration to make an accurate measurement of the position of the knives and is susceptible to damage from crop residue.

Therefore, what is needed is a system that can accurately determine the position of the counter knife bank in a chopper assembly without being susceptible to damage from material passing through the chopper assembly.

SUMMARY

The present application relates to a chopper assembly for harvesting equipment. The chopper assembly includes a rotary chopper element, a chopper grate assembly spaced from the rotary chopper element to form a passageway for crop residue, and a knife bank adjustably connected to the chopper grate assembly. The knife bank is movable between a first position where the knife bank is fully inserted into the passageway and a second position where the knife bank is fully retracted from the passageway. At least one panel is used to at least partially enclose the rotary chopper element, the chopper grate assembly and the knife bank. The chopper assembly also includes an actuating mechanism to move the knife bank between the first position and the second position and a sensor to measure the position of the actuating mechanism and determine a position of the knife bank. The sensor is positioned on an opposite side of the at least one panel from the rotary chopper element, the chopper grate assembly and the knife bank.

The present application further relates to a chopper assembly for a combine. The chopper assembly includes a rotary chopper element, a chopper grate assembly spaced from the rotary chopper element to form a passageway for the passage of crop residue and a knife bank adjustably connected to the chopper grate assembly. The knife bank is movable between a first position where the knife bank is fully inserted into the passageway and a second position where the knife bank is fully retracted from the passageway. The chopper assembly also includes an actuating mechanism to move the knife bank between the first position and the second position and a position sensor to measure the position of the actuating mechanism and determine a position of the knife bank. The position sensor is offset from the actuating mechanism to indirectly measure the position of the actuating mechanism.

The present application additionally relates to a method for controlling operation of a combine. The method includes measuring a rotational speed of a rotary chopper element and comparing the measured rotational speed to a preselected rotational speed. The method also includes measuring a position of a knife bank relative to the rotary chopper element with a sensor offset from the knife bank and comparing the measured position to a preselected position for the knife bank. The method further includes disabling a system for the combine in response to the measured rotational speed being less than or equal to the preselected rotational speed and the measured position not being equal to the preselected position.

One advantage of the present application is increased accuracy in measuring the position of the counter knife bank.

Another advantage of the present application is that the sensor is located outside of the primary flow path of material and is thus less susceptible to damage from the material.

A further advantage of the present application is that in-cab or automated adjustability of the counter knife bank can be enabled based on measured counter knife bank position.

An additional advantage of the present application is better horsepower management in response to the measured counter knife bank position.

Another advantage of the present application is the ability to retract the counter knife bank either manually based on operator commands or automatically based on a closed loop system independent of the operator, when a foreign or non-crop object (e.g., a rock) enters the machine, in order to prevent damage to the chopper assembly or the counter knife bank.

Other features and advantages of the present application will be apparent from the following more detailed description of the exemplary embodiments, taken in conjunction with the accompanying drawings.

BRIEF DESCRIPTION OF THE FIGURES

Wherever possible, the same reference numbers will be used throughout the drawings to refer to the same or like parts.

DETAILED DESCRIPTION OF THE EXEMPLARY EMBODIMENTS

Figure 1:
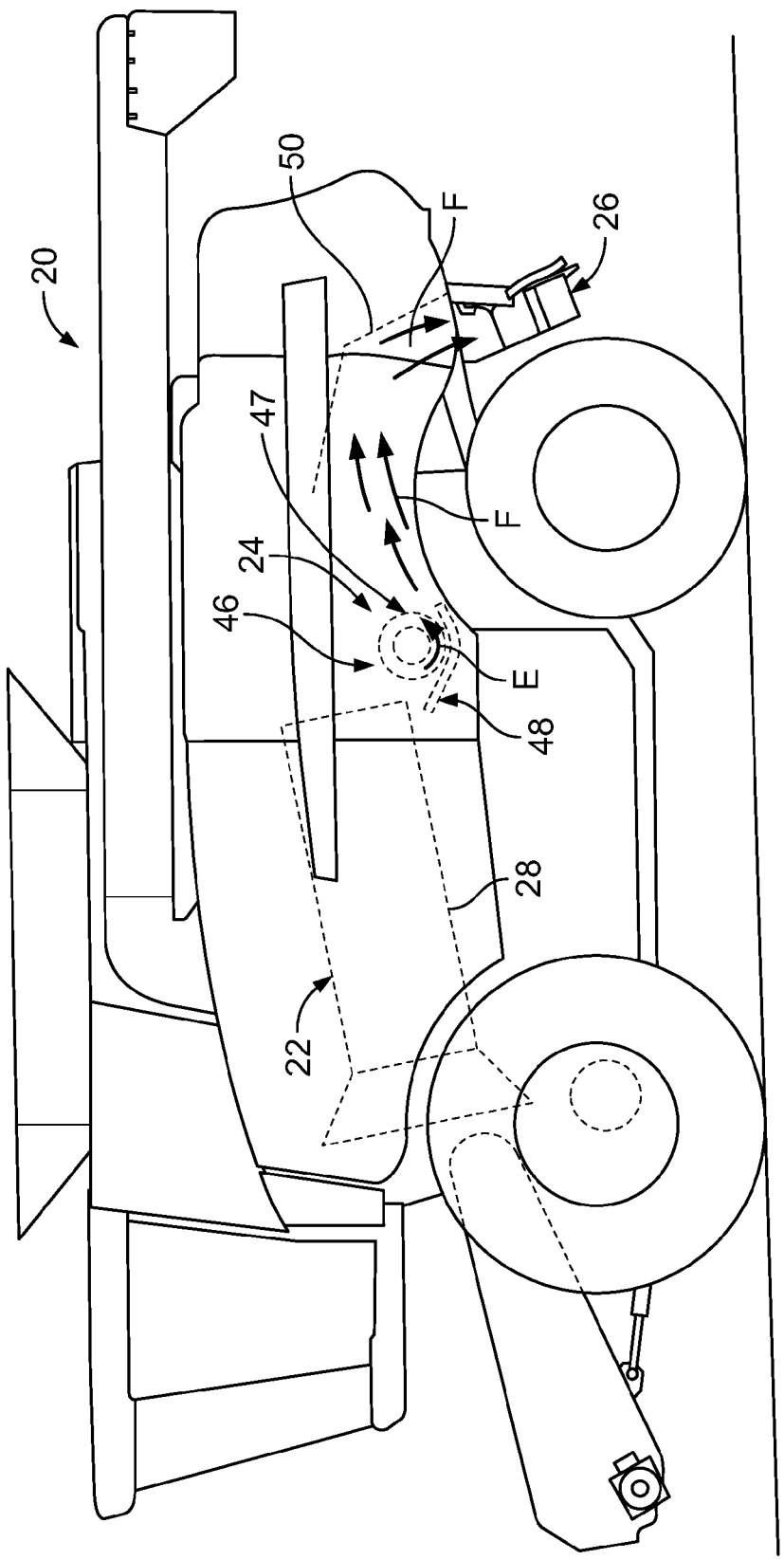
FIG. 1 shows a simplified side plan view, from the left side, of an agricultural combine.
Figure 2:
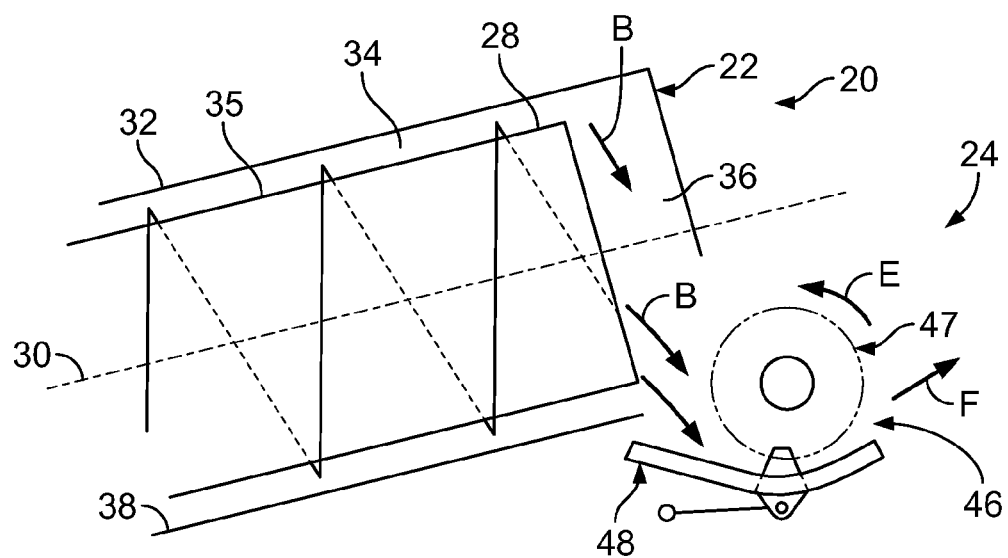
FIG. 2 shows a simplified side plan view, from the left side, of the threshing system and a portion of the crop residue treatment and distribution system of the combine of FIG. 1.

FIGS. 1 and 2 depict an exemplary agricultural combine 20 that can include a longitudinally axially arranged threshing system 22 and a crop residue treatment and distribution system 24 with a crop residue spreader 26. Threshing system 22 can include a cylindrical threshing rotor 28 within a rotor housing 32. The rotor 28 can be conventionally supported and rotatable in a predetermined direction, e.g., clockwise, about a rotational axis 30. The rotor 28 can convey a flow of crop material in a helical flow path through a space 34 extending circumferentially around an outer cylindrical surface 35 of rotor 28 and an inner circumferential surface 38 of rotor housing 32. As the crop material is moved through space 34, the crop, such as grain, legumes, or the like, can be loosened and separated from crop residue, such as husk and pods, and carried away in a conventional manner.

The crop residue can continue along the helical path through space 34, and is then expelled, as denoted by arrows B, into and through a discharge opening and passage 36, which can be an extension of space 34 at the downstream end of threshing rotor 28. The consistency of the flow of crop residue, volume thereof, and extent or pattern thereof, can vary, and may be a function of a variety of conditions, including, but not limited to, the speed of rotation of rotor 28, crop type, plant maturity, moisture content, and weather conditions. As an example, speeds for rotor 28 can vary between just a few hundred RPM to over 1000 RPM. Wheat and other small grains can have relatively small crop residue components, whereas other grains, such as corn, can have larger components, such as thick stalk segments, cob fragments, and large leaves.

Crop residue treatment and distribution system 24 can include a transport and chopping assembly, such as integral chopper assembly 46 configured about an aft portion of the combine 20, sometimes hereinafter referred to as rotary assembly 46, having a rotary chopper element 47 rotatable in a direction E above a concave pan assembly such as chopper grate assembly 48. The chopper assembly 46 is operatively connected downstream of the threshing system 22 to receive the flow of crop material from the threshing system 22. Rotary chopper element 47 can rotate at a rapid speed, so as to be capable of accelerating and propelling a flow of crop residue rearward within the confines of the rear end of combine 20, as generally denoted by arrows F. Such rearward flow can be guided and directed by internal panels or shields, generally denoted by shields 50, to flow through a rear opening so as to be deposited directly onto a field, such as in a windrow, or to flow into a secondary crop residue chopper and/or spreader 26 for spreading in a swath on the field.

Figure 3:
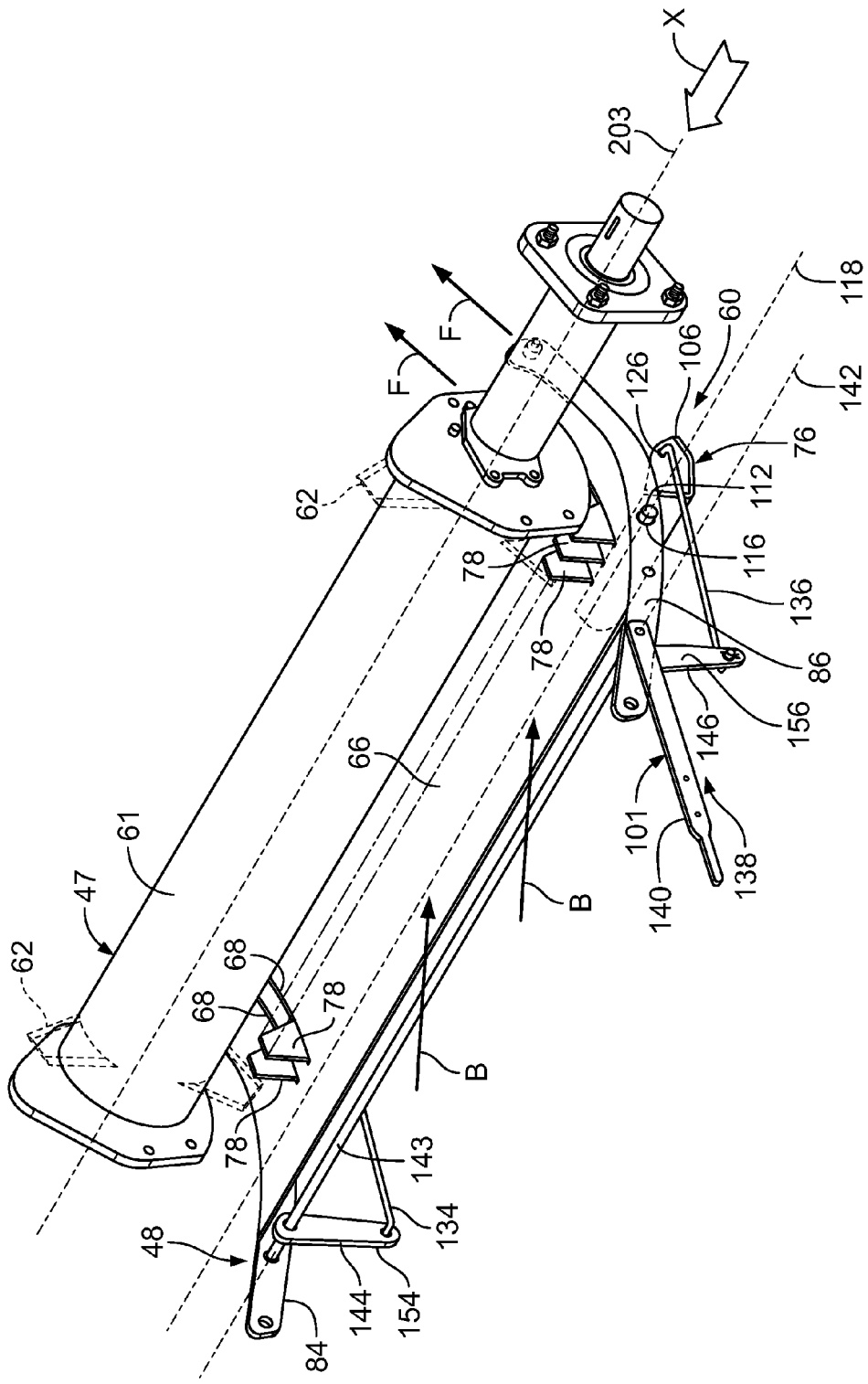
FIG. 3 shows a perspective view, from the left front side, of an integral chopper assembly, showing an exemplary embodiment of a counter knife assembly.
Figure 4:
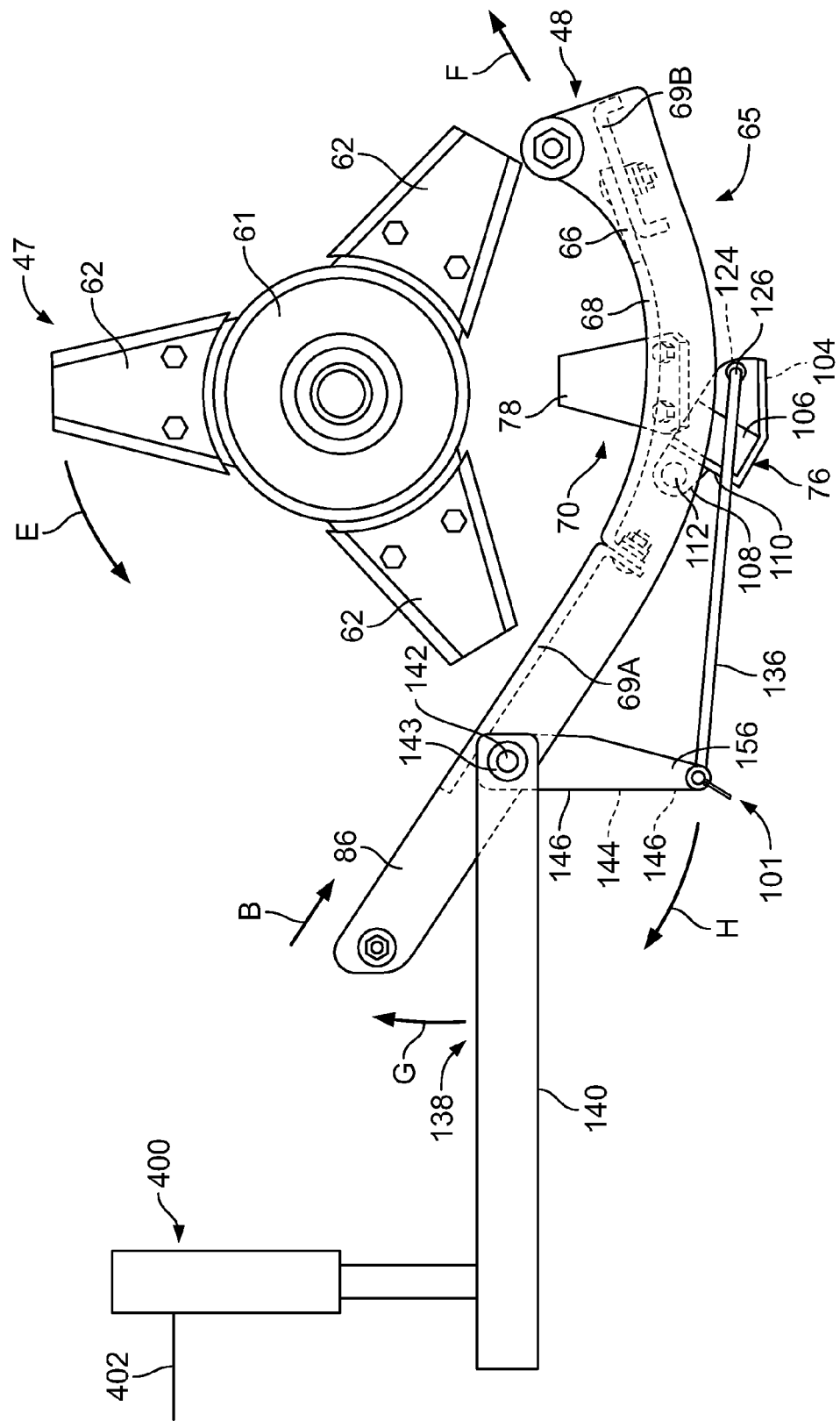
FIG. 4 shows a simplified left side plan view, generally viewed from position X in FIG. 3, of a portion of the integral chopper assembly of FIG. 3.

FIGS. 3-4 depict a portion of an integral chopper assembly 46 that includes not only a concave pan portion that employs a replaceable grate portion and an interruption plate downstream from the slots in the grate portion of the chopper grate assembly 48, but also a rotary chopper portion or element 47 that extends generally horizontally across the flow path of the crop residue above the chopper grate assembly 48. The chopper grate assembly 48 can include a counter knife assembly 60. The rotary chopper element 47 can include a cylindrical element or rotary member 61, and has a number of paddles or knife blades 62 mounted or affixed thereto at a plurality of mounting locations distributed about the periphery. The particular positioning, arrangement, and configuration of the paddles or knife blades 62 can be determined based on particular requirements to be satisfied.

Figure 5:
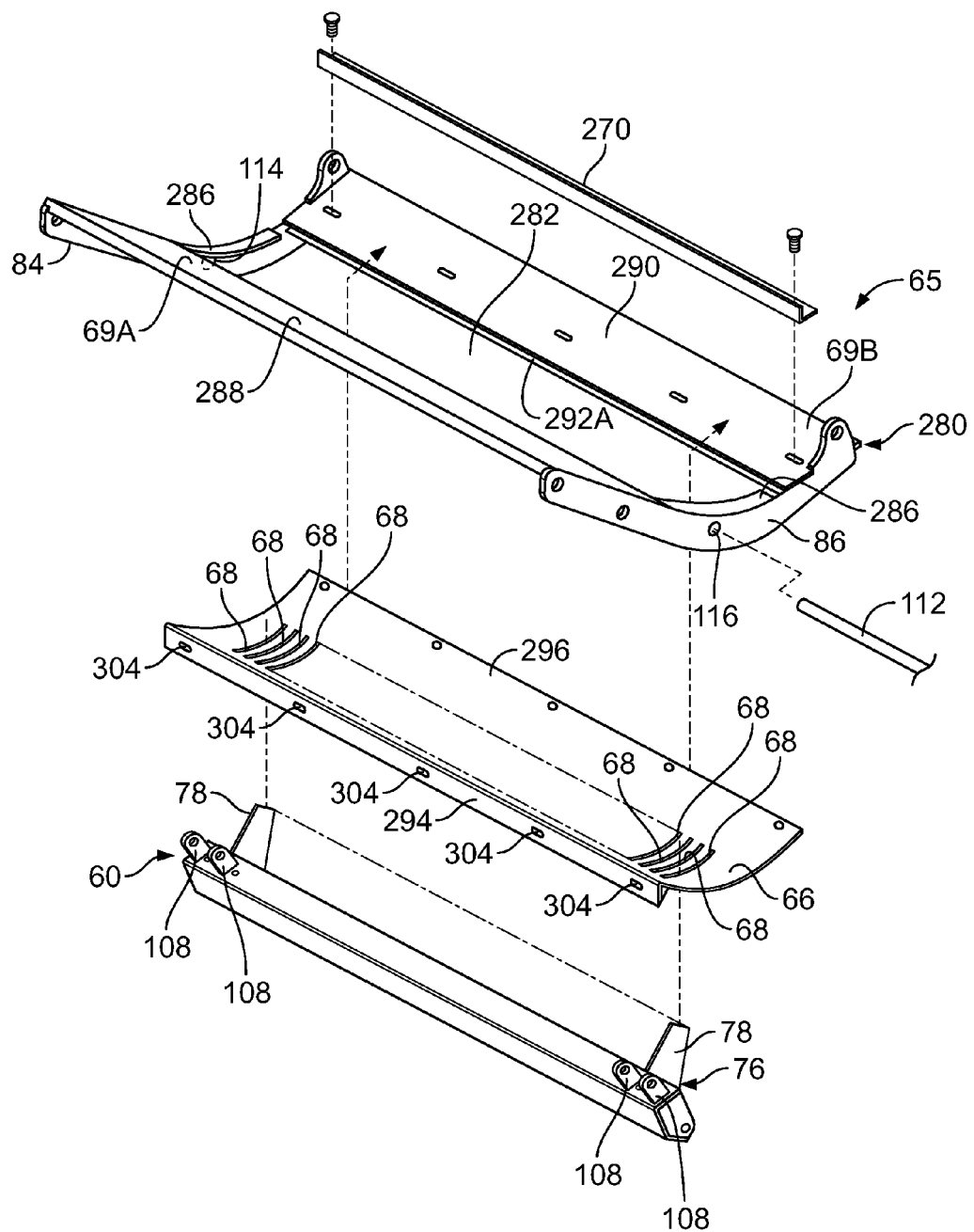
FIG. 5 shows an exploded perspective view of various portions of the concave pan portion of the integral chopper assembly of FIGS. 3 and 4.

FIG. 5 depicts in an exploded view various components of the chopper grate assembly 48 of the integral chopper assembly 46, including a generally concave pan portion 65, sometimes hereinafter also referred to as a concave pan assembly. The concave pan portion 65 includes a grate portion 66 positioned between leading and trailing plate portions 69A and 69B that extends generally parallel to the rotary chopper element 47 with a plurality of spaced slots 68.

In FIG. 4, rotary chopper element 47 and grate portion 66 of concave pan portion 65 of chopper grate assembly 48 define a passageway 70 therebetween for the crop residue flow that is directed to the integral chopper assembly 46 for treatment thereby, such as crop residue flow B from the threshing system 22 (see FIG. 2). The slots 68 in grate portion 66 are generally elongated and extend along the grate portion 66 generally in the direction of the crop residue flow B.

Referring to FIGS. 3-5, the counter knife assembly 60 includes a stationary knife bank 76 having a plurality of spaced knife elements 78 positioned generally beneath and parallel to both rotary chopper element 47 and grate portion 66. The knife elements 78 are mounted at positions along knife bank 76 that correspond to slots 68 in grate portion 66. The slots 68 in grate portion 66 can be sized and configured to permit the knife elements 78, when moved, to project through slots 68.

Figure 6:
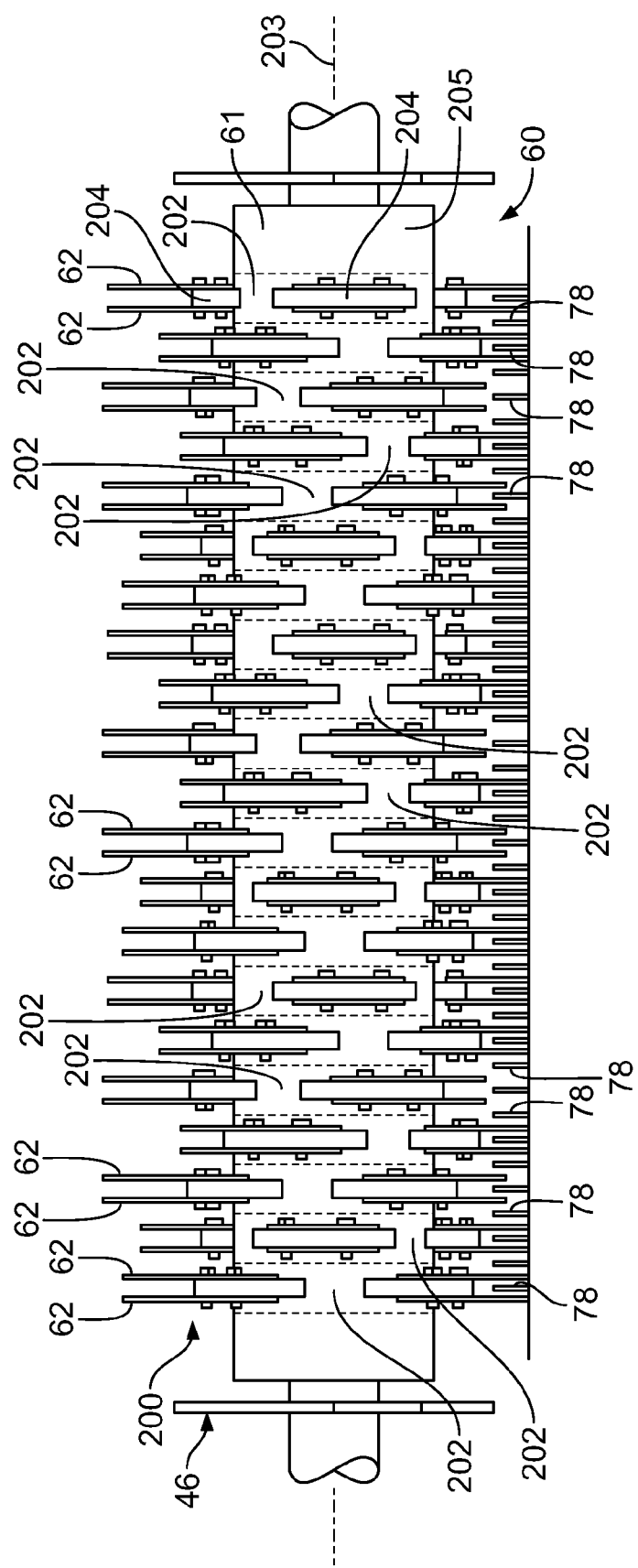
FIG. 6 shows a plan view looking forwardly from the rear of the integral chopper assembly towards the rotary chopper element.

Slots 68 and knife elements 78 are appropriately positioned relative to knife blades 62 of rotary chopper element 47 to permit the knife elements 78 and knife blades 62 to be interengagable with one another, so as to pass adjacent to one another without contacting one another. An exemplary embodiment of the interengagable movement of the knife elements 78 and knife blades 62 is illustrated in FIG. 6, which depicts the rotary element 47 and top portions of the knife elements 78 of the counter knife assembly 60 when the knife elements 78 project through slots 68 of the grate portion 66 into the flow passageway 70. The knife blades 62 and knife elements 78 are so mounted that they are interengageable with one another during a chopping operation without contacting or interfering with one another.

The integral chopper assembly 46 can include an adjustment mechanism 101 for adjustably varying the positioning of the knife bank assembly 76 relative to the grate portion 66 of the chopper grate assembly 48 between a fully engaged position wherein the knife elements 78 of the knife bank assembly 76 extend through the slots 68 of the grate portion 66 of the chopper grate assembly 48 at a maximum projection and a partially or fully retracted position wherein the knife elements 78 project minimally, if at all, through the slots 68. The knife bank 76, which extends between first and second knife bank end plates 104 and 106, is generally spaced from and parallel to both rotary chopper element 47 and grate portion 66 and extends between opposed side wall or plates 84 and 86 of the concave pan portion 65.

The counter knife bank 76, which is dimensioned to extend generally the width of the grate portion 66 between knife bank end plates 104 and 106, includes spaced mounting eyelets 108 along a side 110. A shaft member 112 extends through mounting eyelets 108 to end connections 114 and 116 on the respective opposed side plates 84 and 86 of concave pan portion 65. The shaft member 112, when so mounted through the end connections 114 and 116, defines an engagement positioning axis 118 (see FIG. 3), sometimes hereinafter also referred to as swivel axis 118, about which knife bank 76 can be rotated or pivoted in an arc-like movement.

Knife bank end plates 104 and 106 also include lower portions 124 and 126, which are operatively connected via respective positioning rods 134 and 136 to a lever assembly 138. The lever assembly 138 can be operable to effect, through the coupled movement of positioning rods 134 and 136, a rotation or pivoting of knife bank end plates 104 and 106 and the knife bank 76 about swivel axis 118. The rotation or pivoting of the knife bank can be used to extend or retract the knife elements 78 into or from the flow passageway 70.

Lever assembly 138 includes an operable lever 140 coupled at axis 142 to a rotatable connecting rod 143 that extends between side plates or walls 84 and 86 of concave pan portion 65. The connecting rod 143 can be attached to support links 144 and 146. Support links 144 and 146 are respectively connected to positioning rods 134 and 136.

When lever 140 is operated, as denoted by arrow G in FIG. 4, support links 144 and 146 are caused to rotate thereby effecting rotational movement of end portions 154 and 156 of support links 144 and 146 about axis 142, as denoted by arrow H in FIG. 4, consequent movement of positioning rods 134 and 136, and the resultant rotational movement of the knife bank assembly 76, including knife bank end plates 104 and 106, about swivel axis 118. By thus operating, and then fixing the status of lever assembly 138 at a given position, a user can conveniently alter and fix the positioning of the knife bank 76 relative to grate portion 66, thereby controlling to some extent the amount by which the knife elements 78 are permitted to project through slots 68.

The ability to effect a repositioning of the knife bank 76 relative to grate portion 66 is beneficial in circumstances where a user finds it desirable to be able to withdraw or retract the knife elements 78 of the counter knife assembly 60 from the flow passage 70, such as to clear obstructions/foreign objects as well as in circumstances where the user wishes to adjust the quality of the chop. Typically, the greater the amount of projection, the finer the chop, and the less the amount of projection, the coarser the chop.

It will be understood and appreciated by those skilled in the art that, although the position of knife bank 76 in the embodiment of FIGS. 3-4 is shown controlled by the operation of a lever assembly 138 and associated linkages, various other mechanisms and devices could equally as well be utilized to control the positioning of positioning rods 134 and 136 or, more directly, the swivel positioning of knife bank end plates 104 and 106, or even the placement of knife bank 76 closer or farther from grate portion 66. Such mechanisms and devices may be manually or automatically operable, including remotely by a user, such as from the cab of a combine, and may include various and sundry systems and components of well known construction for effecting the desired movements, placements, or positioning.

For example, as shown in FIG. 4, a solenoid 400 can be operatively connected to the lever assembly 138. The solenoid 400 is connected to the lever 140. The solenoid 400 can be, for example, a New Holland solenoid model 681923, which is a push type solenoid. The solenoid 400 receives a signal i.e., an input, from a controller through solenoid wires 402. Alternatively, the lever can be adjusted by an actuator, hydraulic cylinder, a linear actuator, an pneumatic actuator, an electric actuator, a motor or the like.

In another embodiment, the solenoid 400 can be connected to the knife bank 76 anywhere along its structure so as to move the knife bank 76 from a fully engaged position to at least a partially refracted position. That is, the solenoid 400 can move the knife bank 76 between a first position (e.g., the knife bank 76 is fully retracted from the chopper grate assembly 48) and a second position (e.g., the knife bank 76 is fully engaged with the chopper grate assembly 48).

FIG. 6 shows one exemplary knife blade arrangement 200 in which twenty-one (21) generally like ring portions 202 are axially stacked side-by-side along the longitudinal axis 203 of rotary member 61. Mounts or mounting lugs 204, sometimes hereinafter referred to as lugs, are affixed, such as by welding, to the outer periphery 205 of rotary member 61 at spaced annular intervals that are generally equal to one another.

From previous discussions hereinabove, it should be appreciated that, when the counter knife assembly 60 is in an engaged position, with the knife elements 78 thereof projecting between slots 68 of the grate portion 66 of chopper grate assembly 48, with rotary member 61 being rotated at about 3000 RPM, the knife blades 62 on the rotary member 61 can serve to transport residue rapidly towards the rear of combine 10 and, while doing so, can also interact with the knife elements 78 of the counter knife assembly 60 to chop or cut the residue into smaller pieces. Alternatively, especially if the counter knife assembly 60 is positioned in its refracted position, with the knife elements 78 being retracted within slots 68 of the grate portion 66 of chopper grate assembly 48, with rotary member 61 being rotated at a lesser rate of about 800 RPM, the knife blades 62 on the rotary member 61 can serve to transport residue contacted thereby towards the rear of combine 20, but more slowly and with less damage to the crop residue, as a consequence of which longer and larger pieces of residue will be transported rearward in combine 20.

FIGS. 7-11 depict counter knife assemblies, and components thereof, that may be employed as the counter knife assembly 60 of FIGS. 3-4 in such a way as to better illustrate the manner in which the knife elements 78 are mounted or affixed to knife bank 76. In the exemplary embodiments depicted in FIGS. 7-11, knife bank 76, which can be dimensioned to extend between knife bank end plates 104 and 106 and the width of the grate portion 66 (FIGS. 3 and 4), includes a trough bracket 230 positioned between knife bank end plates 104 and 106, with a plurality of retainment mounts 232 spaced therein and therealong, to each of which retainment mounts 232 at least one knife element 78 may be attached. However, in a further exemplary embodiment as better shown in FIGS. 8 and 11, each retainment mount 232 can be capable of having two spaced, knife elements 78 mounted thereto in a side-to-side arrangement, which knife elements 78 may be of conventional designs and include spaced mounting holes 234 near the bases 236.

Figure 7:
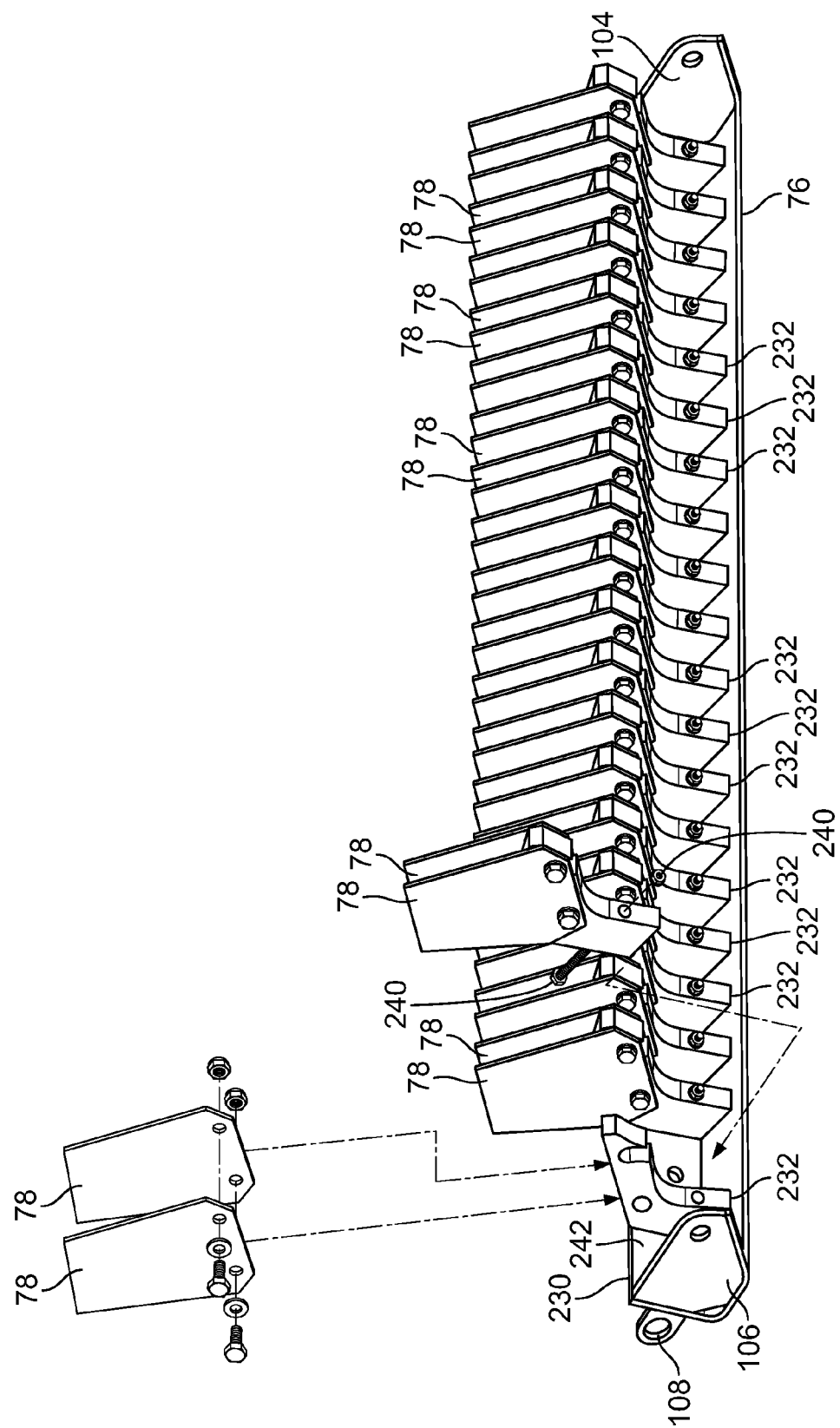
FIG. 7 shows a perspective view of an exemplary knife bank assembly.
Figure 8:
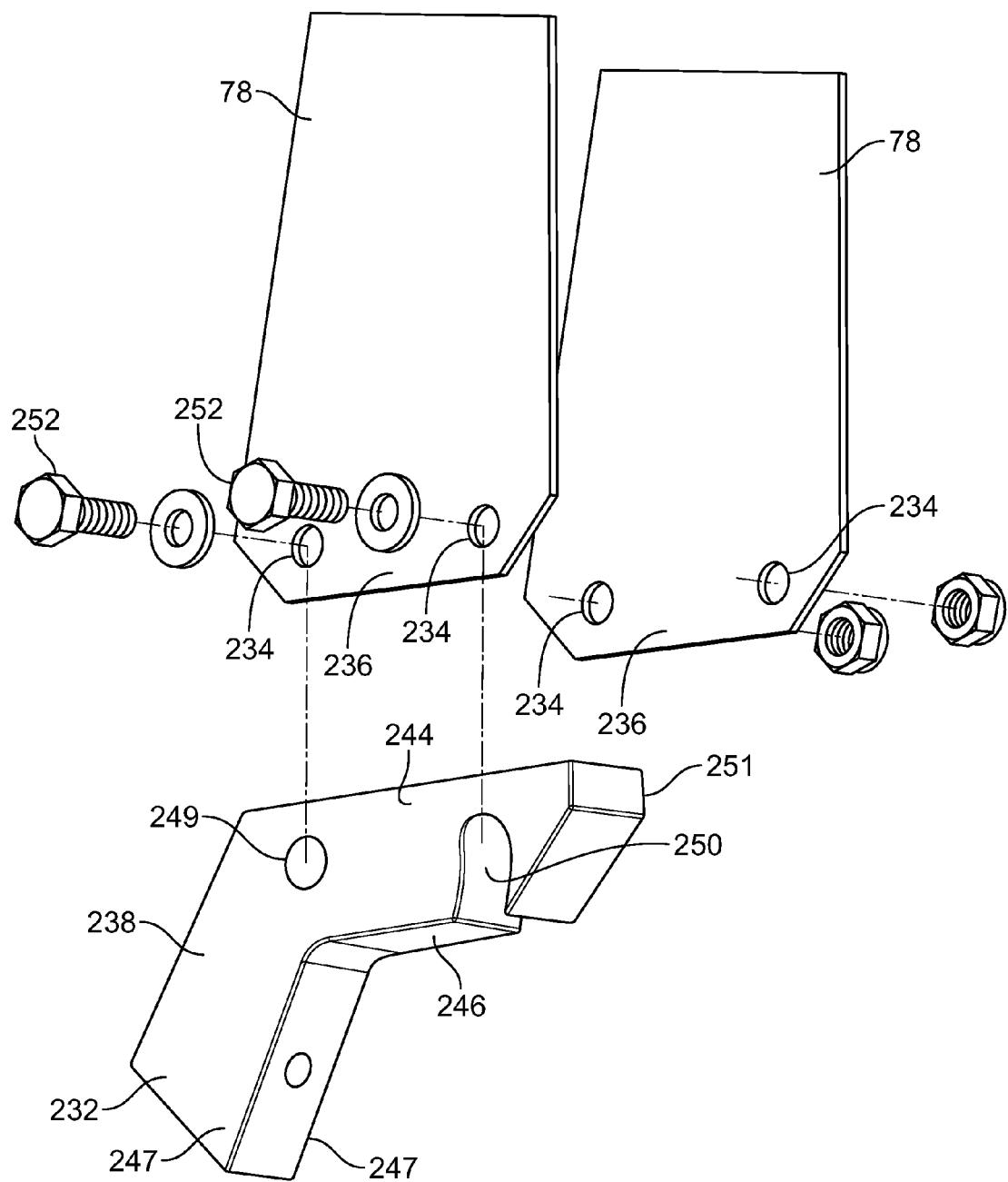
FIG. 8 shows an enlarged perspective view of a retainment mount of the knife bank assembly of FIG. 7.
Figure 9:
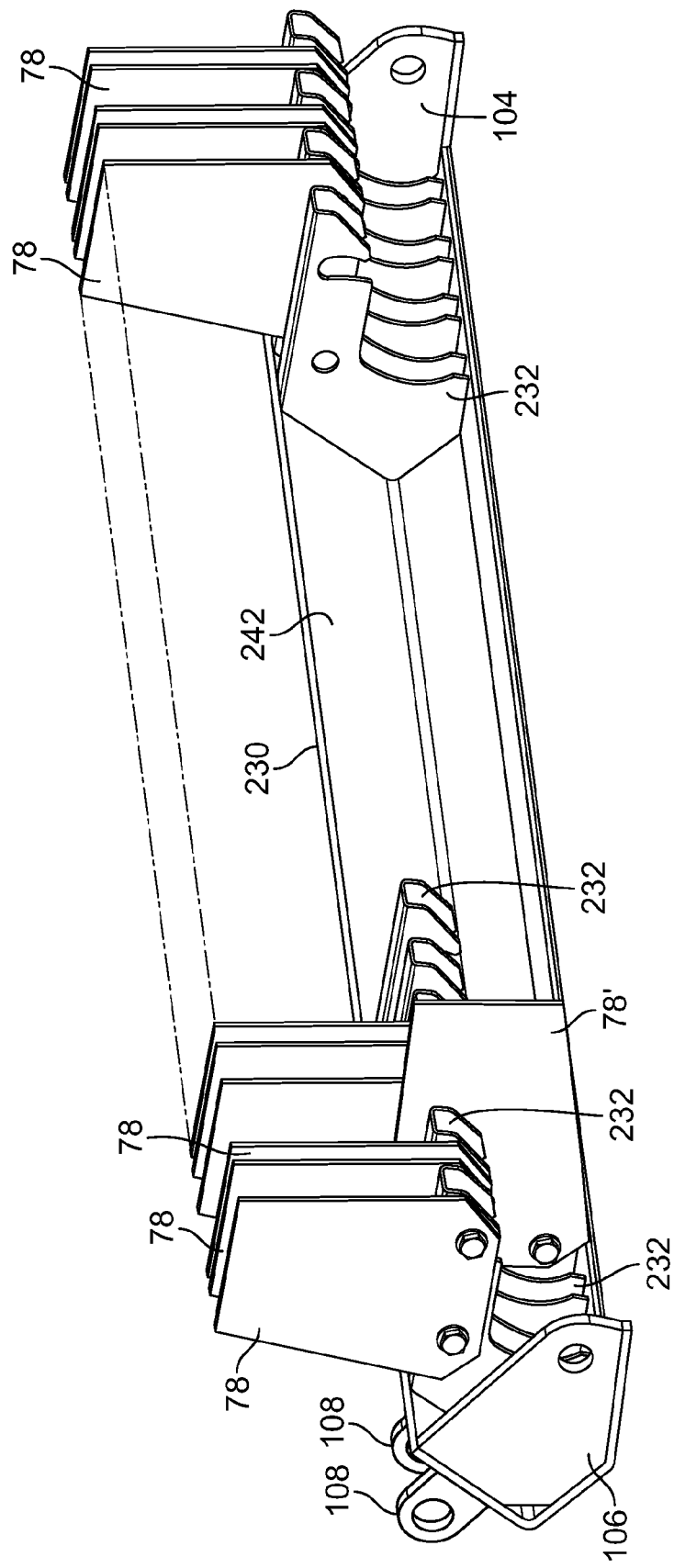
FIG. 9 shows a perspective view of an alternative knife bank assembly.
Figure 10:
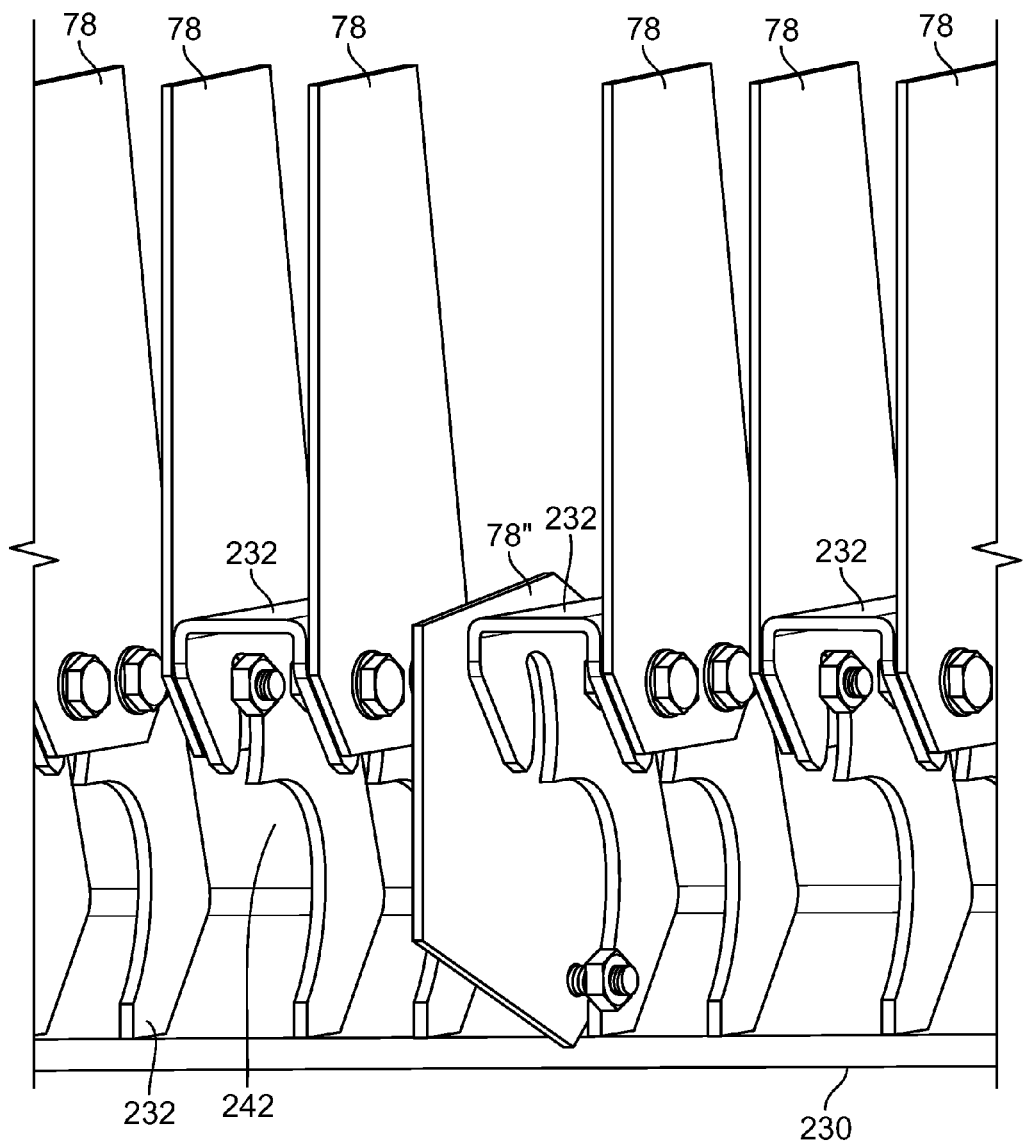
FIG. 10 shows a different perspective view of the alternative knife bank assembly of FIG. 9.
Figure 11:
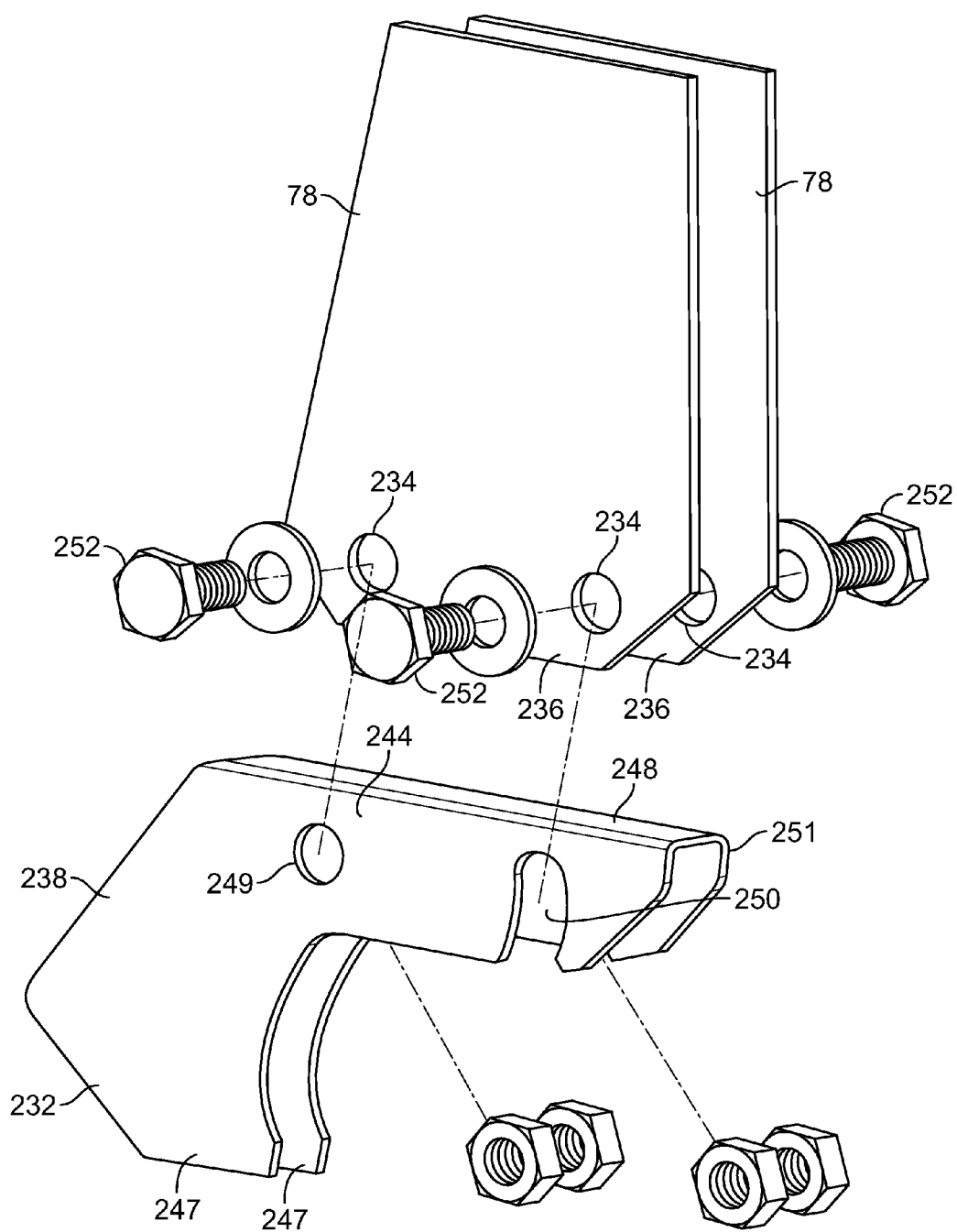
FIG. 11 shows an enlarged perspective view of a retainment mount of the knife bank assembly of FIGS. 9 and 10.

Each retainment mount 232, of which two variations are shown in FIGS. 8 and 11, can be generally pistol-shaped with a grip portion 238 attachable, as by a nut and bolt mounting 240 as shown in FIG. 7 or by welding as shown in FIGS. 9 and 10, along the interior side 242 of the extended trough bracket 230, and a generally flat-sided barrel portion 244 extending outwardly from its juncture with the grip portion 238. In the embodiment depicted in FIG. 8, each retainment mount 232 includes a central body portion 246 between side walls 247, whereas the embodiment depicted in FIG. 11 includes only a central web portion 248 between side walls 247.

Along the barrel portions 244 of each retainment mount 232 are located a mounting hole 249 positioned closer to the grip portion 238 and a mounting slot 250 positioned closer to the distal end 251 of the barrel portion 244. Nut and bolt pairs 252 are utilized to mount the knife elements 78 to the retainment mounts 232, with a first nut and bolt pair associated with mounting hole 249 and one of the spaced mounting holes 234 of a knife element 78 and a second nut and bolt pair associated with mounting slot 250 and the other of the spaced mounting holes 234 of that knife element 78.

When the knife bank 76 is mounted and the various other components of the chopper grate assembly 60 so assembled and configured as depicted in FIG. 3, with the knife elements 78 of the knife bank 76 projecting through slots 68 of grate portion 66, crop residue can be transported through passageway 70 as the knife blades 62 of the rotary member 61 rotate past the knife elements 78 of knife bank 76 in the interengageable fashion as depicted in FIG. 6. If a rock or other foreign object impacts one or more given knife elements 78 of knife bank 76 with sufficient force to overcome the clamping force of the nut and bolt pair 252 associated with mounting slot 248, such knife element 78 may rotate about an axis formed by the nut and bolt pair 252 associated with mounting hole 246, as is shown in FIGS. 9 and 10 wherein knife elements 78' and 78" are shown rotated to displaced or relaxed positions.

Figure 12:
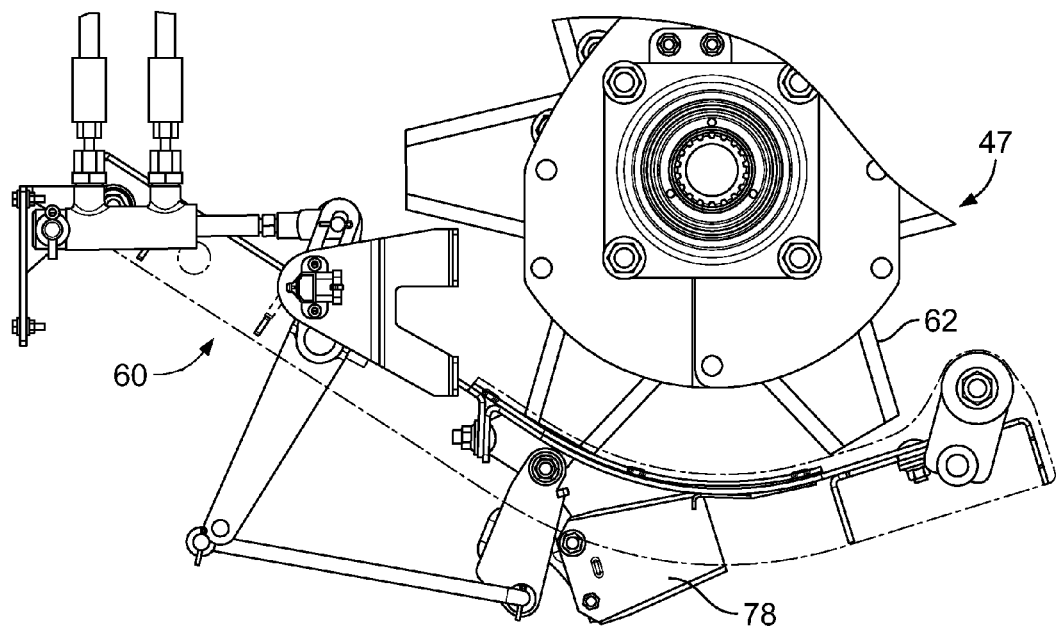
FIGS. 12-14 show, in simplified left side plan views, different positions for the knife blades of the counter knife assembly.
Figure 13:
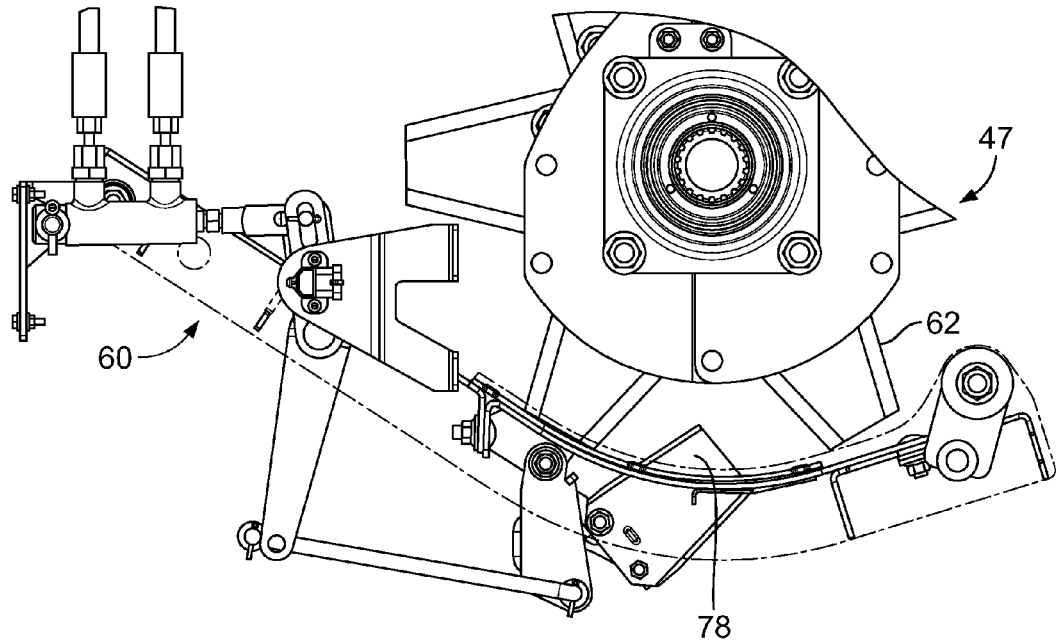
Figure 14:
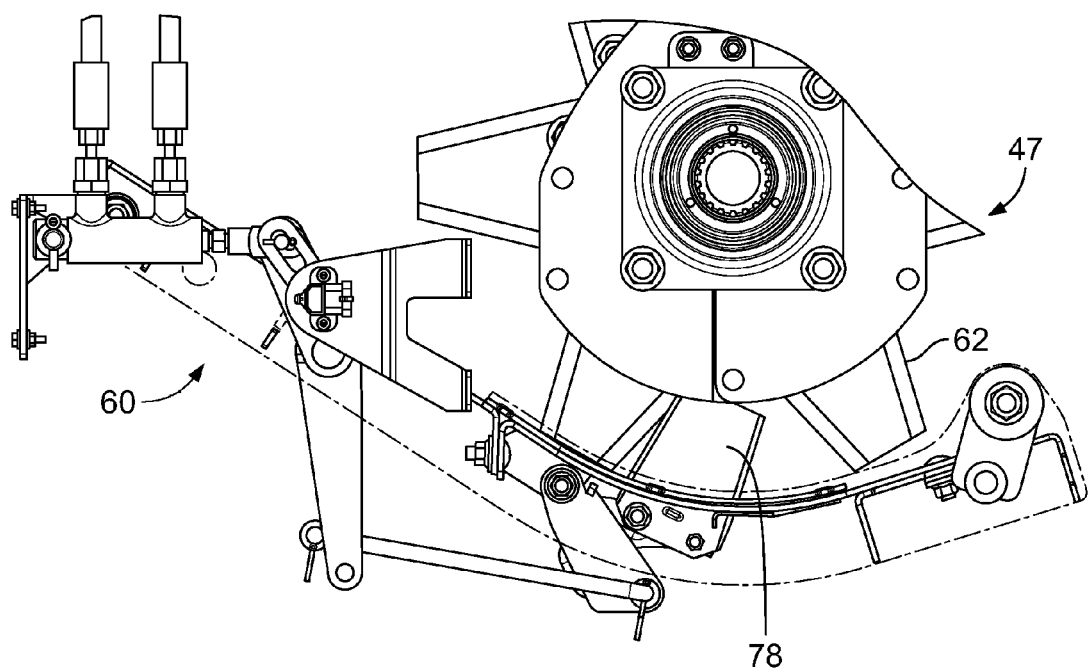

FIGS. 12-14 show different positions for the knife blades 78 of the counter knife assembly 60. FIG. 12 shows the counter knife assembly 60 and knife blades 78 in a completely retracted position or at a zero degree (0°) insertion position. When the counter knife assembly 60 is in the refracted position, the knife blades 78 are positioned out of the flow path of the crop residue and do not provide any additional chopping of the crop residue travelling through the chopper assembly 46. FIG. 13 shows the counter knife assembly 60 and knife blades 78 in a fifty percent (50%) inserted position or at a twenty four degree (24°) insertion position. When the counter knife assembly 60 is in the 50% position, the knife blades 78 are partially positioned in of the flow path of the crop residue and can provide some additional chopping of the crop residue travelling through the chopper assembly 46. FIG. 14 shows the counter knife assembly 60 and knife blades 78 in a fully inserted position or at a forty eight degree (48°) insertion position. When the counter knife assembly 60 is in the fully inserted position, the knife blades 78 are positioned in the flow path of the crop residue and provide the most additional chopping of the crop residue travelling through the chopper assembly 46.

In one exemplary embodiment, the amount of rotation of the knife bank assembly 76 determines the amount of insertion of the knife blades. In the exemplary embodiment shown in FIGS. 12-14, the knife bank assembly 76 is rotated 48 degrees to travel from the completely retracted position to the fully inserted position. In other exemplary embodiments, the amount of rotation or degrees of rotation required to have the knife bank assembly 76 travel from the completely refracted position to the fully inserted position can be in the range of about 20° to about 70°.

Figure 15:
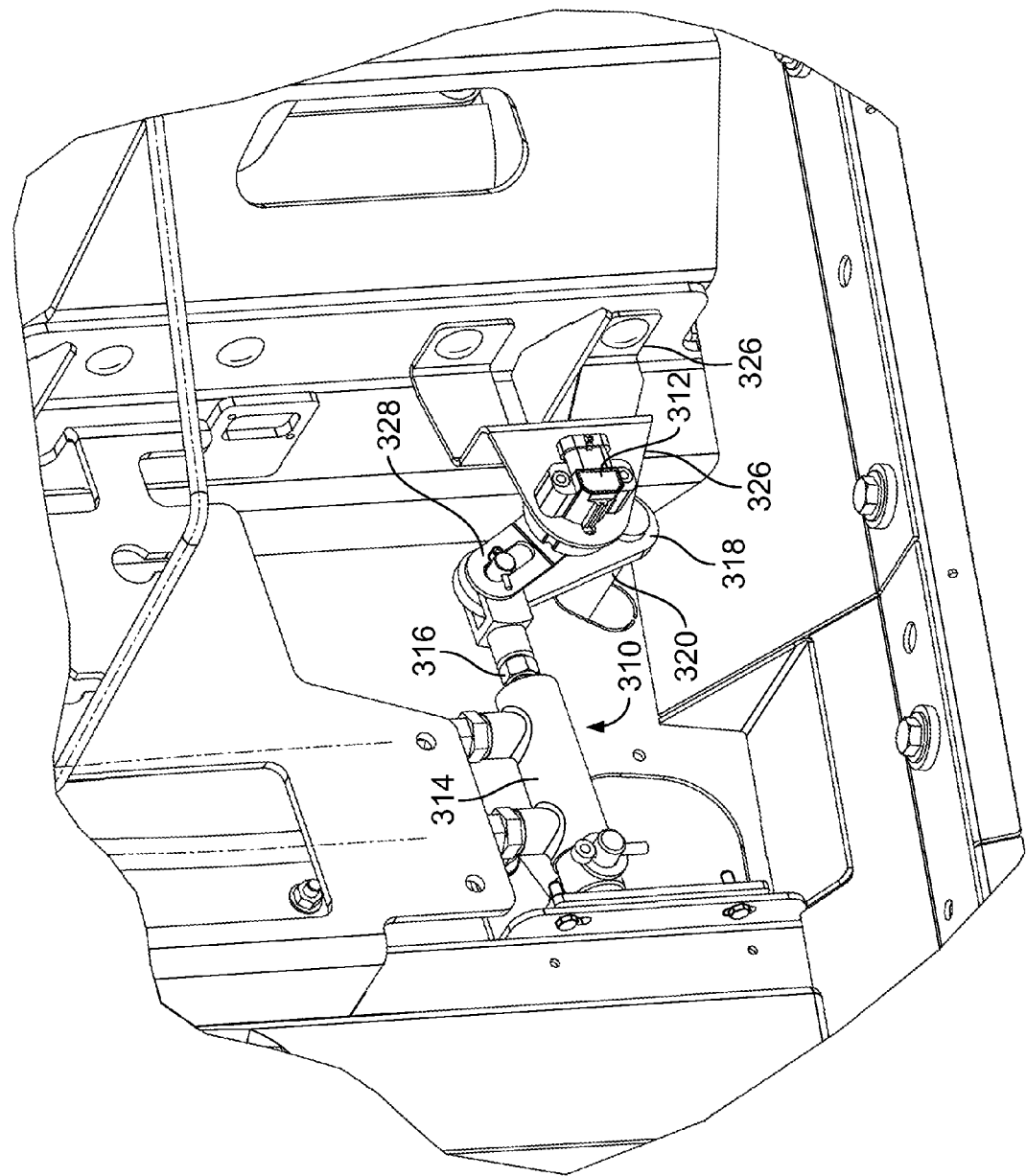
FIG. 15 shows, in a simplified left side plan view, an actuating mechanism for the counter knife assembly and a sensor for determining the position of the counter knife assembly.
Figure 16:
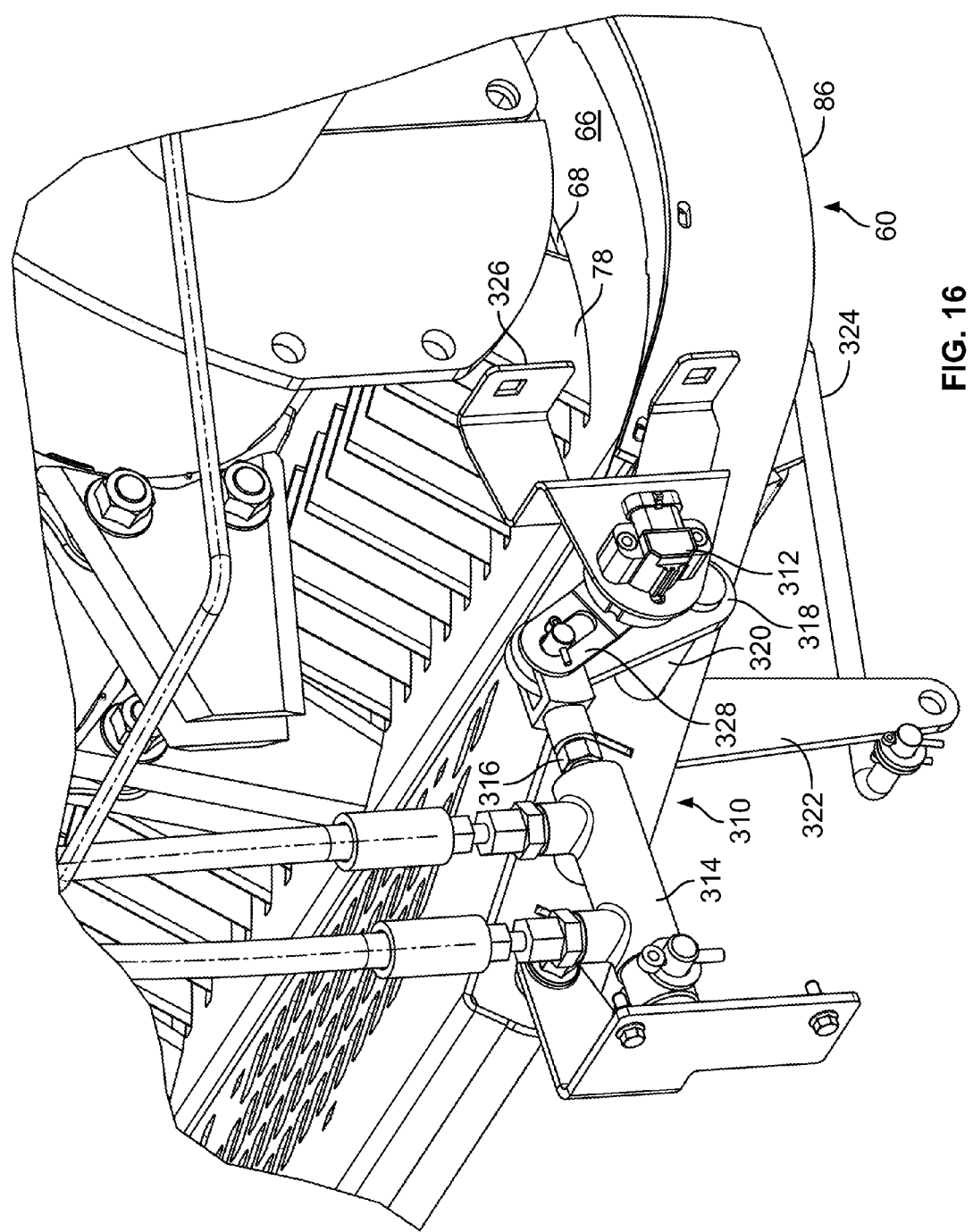
FIG. 16 shows a cut away view showing additional details of the actuating mechanism and sensor of FIG. 15.

In FIGS. 15 and 16, an actuating mechanism 310 is used to adjust or move the position of the counter knife assembly 60 and/or the knife bank assembly 76. A position sensor 312 is located relative to the actuating mechanism 310 to measure or calculate the position of the actuating mechanism 310 and thereby measure or calculate the position of the counter knife assembly 60. In one exemplary embodiment, the position sensor 312 can measure the position of the actuating mechanism regardless of whether the actuating mechanism is manually operated or machine operated (see e.g., FIGS. 3-4). The position sensor 312 and part of the actuating mechanism 310 can be located outside of the chopper assembly 46 and the flow path of crop residue. Stated differently, the position sensor 312 and part of the actuating mechanism 310 are separated from the chopper assembly 46 by one or more shields or panels. However, in other exemplary embodiments, the position sensor 312 and actuating mechanism 310 can be located in closer proximity to the chopper assembly 46, e.g., inside the shield or panel.

The actuating mechanism 310 includes a hydraulic cylinder 314 that can be used to move a rod 316 in an axial direction based on the amount of fluid in the hydraulic cylinder 314. In another exemplary embodiment, hydraulic cylinder 314 can be replaced by a solenoid (see FIG. 4), a pneumatic cylinder, a linear actuator, an pneumatic actuator, an electric actuator or a motor. The rod 316 can be connected to a first arm 318 that can be substantially coplanar with the rod 316. The first arm 318 can be connected to a linkage 320 that extends substantially perpendicularly from the first arm 318 into the chopper assembly 46. Linkage 320 can operate similar to connecting rod 143 (see FIG. 4). In one exemplary embodiment, the linkage 320 can extend substantially the entire width of the counter knife assembly 60 or the linkage 320 can extend only a portion of the width of the counter knife assembly 60. The linkage 320 can be connected to at least one second arm 322 depending on how far the linkage extends into the chopper assembly 46. The second arm(s) 322 can be positioned substantially parallel to the first arm 318. Second arm(s) 322 can operate similar to support links 144 and 146 (see FIG. 4). The second arm(s) 322 can be connected to positioning rod(s) 324 to adjust the position of the counter knife assembly 60. Positioning rod(s) 324 operate similar to positioning rods 134, 136 (see FIG. 4).

Figure 18:
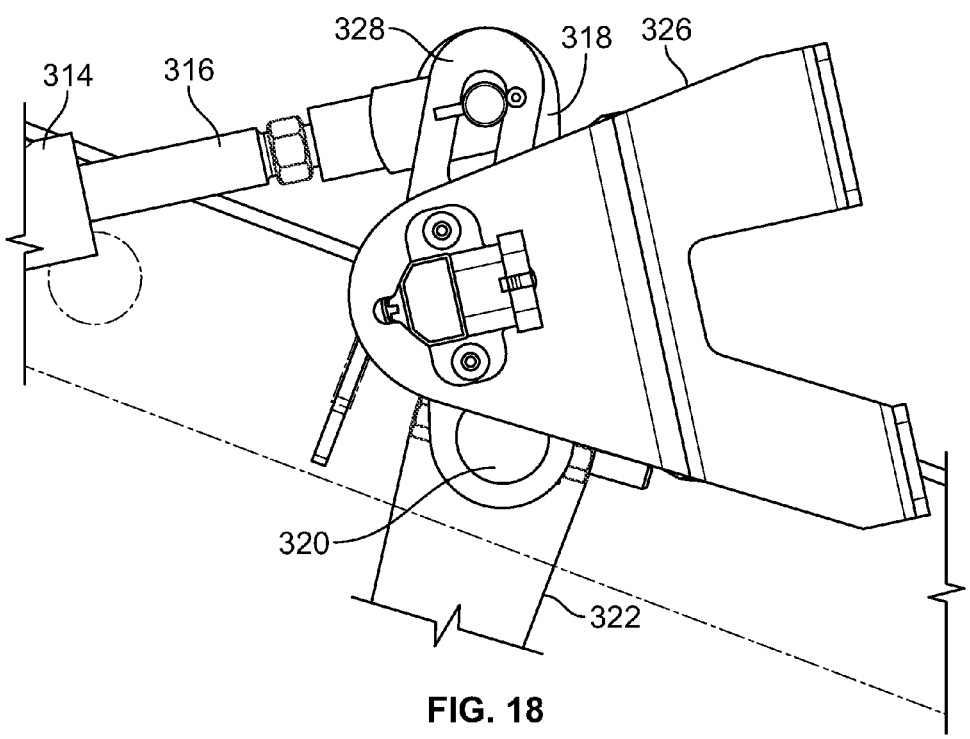

In one exemplary embodiment, the hydraulic cylinder 314 moves rod 316 back and forth in the axial direction to pivot or rotate the first arm 318 and rotate linkage 320. For example, as shown in FIG. 18, the exposed end of rod 316 can be moved away from hydraulic cylinder 314 to pivot first arm 318 in a clockwise direction and similarly rotate linkage 320 in a clockwise direction. The rotation of linkage 320 in a clockwise direction can pivot or rotate second arm 322 in a clockwise direction and axially moves the end of positioning rod 324 connected to second arm 322 away from the counter knife assembly 60 to move/rotate the counter knife assembly 60 and knife blades 78 to a fully or completely retracted position.

Figure 17:
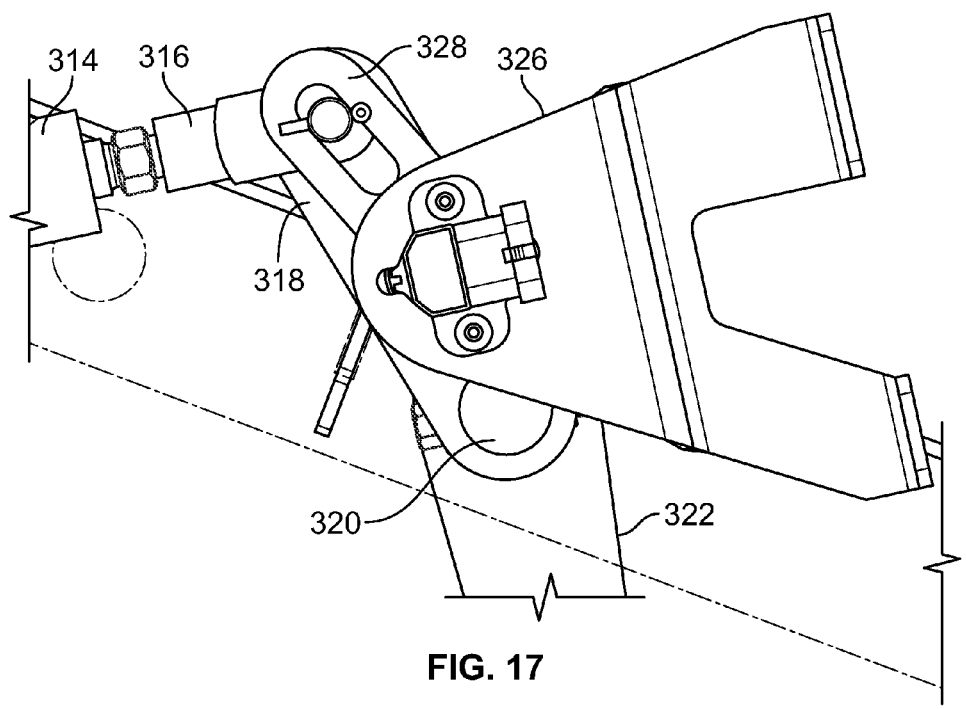
FIGS. 17-18 show, in simplified left side plan views, different positions for the actuating mechanism and sensor of FIG. 15.

In contrast, as shown in FIG. 17, the movement of exposed end of rod 316 toward hydraulic cylinder 314 pivots first arm 318 in a counter-clockwise direction and similarly rotates linkage 320 in a counter-clockwise direction. The rotation of linkage 320 in a counter-clockwise direction can pivot second arm 322 in a counter-clockwise direction and axially move the end of positioning rod 324 connected to second arm 322 toward the counter knife assembly 60 to move/rotate the counter knife assembly 60 and knife blades 78 to a fully inserted position. In one exemplary embodiment, the actuating mechanism 310 can be used to position the counter knife assembly 60 and knife blades 78 to any position between and including a fully retracted position and a fully inserted position.

Position sensor 312 is mounted in close proximity to actuating mechanism 310 by a bracket 326 to measure the position of the actuating mechanism 310 and thereby measure or determine the position of the counter knife assembly 60. In one exemplary embodiment, the position sensor 312 is offset from the actuating mechanism 310, specifically, the first arm 318, and can measure the position of the first arm 318 using a third arm 328. The third arm 328 is pinned or connected to the rod 316 and first arm 318 at one end, e.g., using a pin and slot connection, and is coupled to the position sensor 312 at the other end. The coupling of the position sensor 312 to the third arm 328 permits the position sensor 312 to rotate proportional to the motion of rod 316, first arm 318 and linkage 320.

FIGS. 17 and 18 show the movement of the third arm 328 when the counter knife assembly 60 is moved from the fully retracted position to the fully inserted position. Third arm 328 is positioned relative to the rod 316 and the first arm 318 to have a greater angular displacement than the first arm 318 when the counter knife assembly 60 is moved between the fully retracted position and the fully inserted position. By providing the third arm 328 with a greater angular displacement than the first arm 318, the third arm 328 operates as a "multiplier" for the angular displacement of the first arm 318 and provides for a more accurate measurement of the position of the actuating mechanism 310.

For example, the first arm 318 can have an angular displacement of twenty eight degrees (28°), while the third arm 328 can have an angular displacement of forty nine degrees (49°). In another example, the first arm 318 can have an angular displacement of thirty two degrees (32°), while the third arm 328 can have an angular displacement of fifty six degrees (56°). Thus, in either example, for each degree (1°) of movement of the first arm 318, the third arm 328 is moved one and three fourths degrees) (1.75°. In other exemplary embodiments, the third arm 328 can have a greater angular displacement than the first arm by a factor in the range of about 1.25 to about 3.0, i.e., for every 1° of movement of the first arm, the third arm can be moved between about 1.25° and about 3.0° depending on the factor selected. By having a greater angular displacement for the third arm 328, the position sensor 312 has a greater resolution and can more easily detect movements of the actuating mechanism 310 to provide a more accurate position for the actuating mechanism 310 and counter knife assembly 60. In still another exemplary embodiment, the angular displacements of the first arm 318 and/or third arm 328 do not have to be equal to the angular displacement of the counter knife assembly 60 or knife bank assembly 76. The angular displacement of the counter knife assembly 60 or the knife bank assembly 76 can be related to the angular displacement of the first arm 318 or third arm 328 by a predetermined ratio.

Once the position sensor 312 has determined or calculated the position of the actuating mechanism 310 and counter knife assembly 60, the position sensor 312 can output or provide a signal to a control and/or monitoring system that is representative of the position of the counter knife assembly 60. The control system can then use the signal with the corresponding position information for the counter knife assembly 60 to control various other systems in combine 20. For example, the signal from position sensor 312 can be used to provide optimization/automation based on efficiency goals by self setting the control system based on operating goals such as shortest time, best quality, or lowest operating costs and/or by providing feedback for approximate horsepower consumption based on a calibration of the crop harvested.

In one exemplary embodiment, the position sensor 312 can be a potentiometer. However, in other exemplary embodiment, the position sensor 312 can be any suitable measuring device that can be used to measure the position of the third arm 328 and thereby measure the position of the actuating mechanism 310 and the counter knife assembly 60. In other exemplary embodiments, the position sensor 312 can measure the position of the hydraulic cylinder 314 to determine the position of the actuating mechanism 310; the hydraulic cylinder 314 can be a hydraulic cylinder with a built in sensor or potentiometer to measure the position of the hydraulic cylinder; or a series of discrete position sensors or proximity switches can be used to incrementally measure the position of the actuating mechanism 310. In still other exemplary embodiments, position sensors can be used that directly measure shaft rotation (both within and outside the chopping area) or position sensors can be used that directly measure linkage travel in the actuating mechanism.

In a second exemplary embodiment, the knife bank assembly 76 can have differing degrees of insertion based upon the length of the positioning arms and the pivot arm radiuses used with the knife bank assembly 76. For example, a difference in the amount of insertion of a knife bank assembly 76 can be based on a change in the corresponding pivot radius of the knife bank assembly 76. In an exemplary embodiment, for a given first arm 318 angular displacement, a larger pivot radius of the knife bank assembly 76, corresponds to a lesser amount of insertion of the knife bank assembly 76.

In another exemplary embodiment, a proximity sensor or position sensor can be used to measure or determine whether the counter knife assembly is in the fully retracted position. The proximity sensor can be use to determine whether a manually operated handle or a system controlled actuator or cylinder is in a position corresponding to the counter knife assembly being in the fully retracted position. The signal from the proximity sensor can then be used to control the operation of the combine. For example, the threshing system or chopper assembly of the combine can be disengaged in response to a signal from the proximity sensor indicating that the counter knife assembly is not in the fully refracted position and the chopper assembly being operated at 800 RPM. In another example, the signal from the proximity sensor is not used when the chopper assembly is operated at 3000 RPM because the counter knife assembly can be located in any position from fully retracted to fully inserted when the chopper assembly is operated at 3000 RPM.

In a further exemplary embodiment, the position sensor can be used to measure the position of a counter knife assembly that is moved axially, either vertically or horizontally, between the fully retracted position and the fully inserted position.

Although the foregoing discussions have been presented with particular reference to integral chopper assemblies, it should be understood and appreciated that the present application is not intended to be and should not be considered to be limited to use or practice in or with integral chopper systems. It should be recognized that the present application may well also find application and be advantageously employed and practiced in various other types of chopper systems, including, by way of example only and not of limitation, hood mount chopper systems. Accordingly, references in the claims which follow to chopper assemblies or chopper systems are intended to be broadly treated and not limited to integral chopper assemblies or systems.

In the further consideration of the drawings of this application and the discussion of such drawings and the elements shown therein, it should also be understood and appreciated that, for purposes of clarity in various of such drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Many of the fastening or connection processes and components utilized in the application are widely known and used, and their exact nature or type is not necessary for an understanding of the application by a person skilled in the art. Also, any reference herein to the terms "left" or "right" is used as a matter of mere convenience, and is determined by standing at the rear of the machine facing in its normal direction of travel. Furthermore, the various components shown or described herein for any specific embodiment in the application can be varied or altered as anticipated by the application and the practice of a specific embodiment of any element may already by widely known or used by persons skilled in the art.

It will be understood that changes in the details, materials, steps and arrangements of parts which have been described and illustrated to explain the nature of the application will occur to and may be made by those skilled in the art upon a reading of this disclosure within the principles and scope of the application. The foregoing description illustrates an exemplary embodiment of the invention; however, concepts, as based upon the description, may be employed in other embodiments without departing from the scope of the application.

While the application has been described with reference to an exemplary embodiment, it will be understood by those skilled in the art that various changes may be made and equivalents may be substituted for elements thereof without departing from the scope of the application. In addition, many modifications may be made to adapt a particular situation or material to the teachings of the application without departing from the essential scope thereof. Therefore, it is intended that the application not be limited to the particular embodiment disclosed as the best mode contemplated for carrying out this application, but that the invention will include all embodiments falling within the scope of the appended claims.

What is claimed is:

1. A chopper assembly for harvesting equipment comprising:
    a rotary chopper element;
    a chopper grate assembly spaced from the rotary chopper element to form a passageway for crop residue;
    a knife bank adjustably connected to the chopper grate assembly, the knife bank being movable between a first position where the knife bank is fully inserted into the passageway and a second position where the knife bank is fully retracted from the passageway;
    at least one panel at least partially enclosing the rotary chopper element, the chopper grate assembly and the knife bank;
    an actuating mechanism to move the knife bank between the first position and the second position;
    a sensor to measure the position of the actuating mechanism and determine a position of the knife bank; and
    the sensor being positioned on an opposite side of the at least one panel from the rotary chopper element, the chopper grate assembly and the knife bank.

2. The chopper assembly of claim 1 wherein the sensor is offset from the actuating mechanism to indirectly measure the position of the actuating mechanism.

3. The chopper assembly of claim 1 wherein:
    the actuating mechanism comprises a hydraulic cylinder, a rod and a first arm, the hydraulic cylinder, rod and first arm are positioned on an opposite side of the at least one panel from the rotary chopper element, the chopper grate assembly and the knife bank;
    the hydraulic cylinder is configured to move the rod in an axial direction;
    the rod is connected to the first arm and the first arm is pivoted by movement of the rod to move the knife bank between the first position and the second position;
    the sensor comprises a second arm connected to the rod and the second arm is pivoted by movement of the rod; and
    the sensor is configured to detect movement of the second arm and determine the position of the actuating mechanism based on movement of the second arm.

4. The chopper assembly of claim 3 wherein the actuating mechanism further comprises:
    a linkage connected to the first arm and rotated by movement of the first arm, the linkage extending through the at least one panel;
    a third arm connected to the linkage, the third arm being pivoted by rotation of the linkage;

a positioning arm connected to the third arm, the positioning arm being moved axially by movement of the third arm;

a portion of the linkage, the third arm and the positioning arm are positioned on a side of the at least one panel with the rotary chopper element, the chopper grate assembly and the knife bank; and the knife bank being connected to the positioning arm, the knife bank being pivoted between the first position and the second position by movement of the positioning arm.

5. The chopper assembly of claim 4 wherein the second angular displacement is greater than the first angular displacement by a factor in the range of about 1.25 to about 3.0.

6. The chopper assembly of claim 4 wherein the first angular displacement is about 32 degrees and the second angular displacement is about 56 degrees.

7. The chopper assembly of claim 3 wherein:
the first arm has a first angular displacement;
the second arm has a second angular displacement; and
the second angular displacement is greater than the first angular displacement.

8. The chopper assembly of claim 7 wherein the second angular displacement is greater than the first angular displacement by a factor of about 1.75.

9. The chopper assembly of claim 1 wherein the sensor comprises a potentiometer.

10. A chopper assembly for a combine comprising:
a rotary chopper element;
a chopper grate assembly spaced from the rotary chopper element to form a passageway for the passage of crop residue;
a knife bank adjustably connected to the chopper grate assembly, the knife bank being movable between a first position where the knife bank is fully inserted into the passageway and a second position where the knife bank is fully retracted from the passageway;
an actuating mechanism to move the knife bank between the first position and the second position;
a position sensor to measure the position of the actuating mechanism and determine a position of the knife bank; and
the position sensor is offset from the actuating mechanism to indirectly measure the position of the actuating mechanism.

11. The chopper assembly of claim 10 further comprising:
at least one panel at least partially enclosing the rotary chopper element, the chopper grate assembly and the knife bank; and the position sensor being positioned on an opposite side of the at least one panel from the rotary chopper element, the chopper grate assembly and the knife bank.

12. The chopper assembly of claim 10 wherein:
the actuating mechanism comprises a hydraulic cylinder, a rod and a first arm;
the hydraulic cylinder is configured to move the rod in an axial direction;
the rod is connected to the first arm and the first arm is pivoted by movement of the rod to move the knife bank between the first position and the second position;
the position sensor comprises a second arm connected to the rod and the second arm is pivoted by movement of the rod; and
the position sensor is configured to detect movement of the second arm and determine the position of the actuating mechanism based on movement of the second arm.

13. The chopper assembly of claim 12 wherein the actuating mechanism further comprises:
a linkage connected to the first arm, the linkage is rotated by movement of the first arm;
a third arm connected to the linkage, the third arm being pivoted by rotation of the linkage;
a positioning arm connected to the third arm, the positioning arm being moved axially by movement of the third arm; and
the knife bank being connected to the positioning arm, the knife bank being pivoted between the first position and the second position by movement of the positioning arm.

14. The chopper assembly of claim 12 wherein;
the first arm has a first angular displacement;
the second arm has a second angular displacement; and
the second angular displacement is greater than the first angular displacement.

15. The chopper assembly of claim 14 wherein the second angular displacement is greater than the first angular displacement by a factor in the range of about 1.25 to about 3.0.

16. The chopper assembly of claim 15 wherein the second angular displacement is greater than the first angular displacement by a factor of about 1.75.

17. The chopper assembly of claim 14 wherein the first angular displacement is about 32 degrees and the second angular displacement is about 56 degrees.

18. The chopper assembly of claim 10 wherein the position sensor comprises a potentiometer.

* * * * *